United States Patent
Hack

(10) Patent No.: US 6,978,260 B2
(45) Date of Patent: Dec. 20, 2005

(54) SYSTEM AND METHOD FOR STORING DATA

(75) Inventor: Stephen P. Hack, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/127,934

(22) Filed: Apr. 23, 2002

(65) Prior Publication Data

US 2003/0200223 A1 Oct. 23, 2003

(51) Int. Cl.[7] .................. G06F 17/30; G06F 17/00

(52) U.S. Cl. .................. 707/1; 707/2; 707/205; 715/509

(58) Field of Search .................. 707/1–2, 9–10, 707/100, 205; 715/509, 526

(56) References Cited

U.S. PATENT DOCUMENTS

| 5,237,678 | A | * | 8/1993 | Kuechler et al. | 707/5 |
| 5,615,367 | A | * | 3/1997 | Bennett et al. | 707/102 |
| 5,826,257 | A | * | 10/1998 | Snelling, Jr. | 707/4 |
| 6,073,129 | A | * | 6/2000 | Levine et al. | 707/4 |

* cited by examiner

Primary Examiner—Alford W. Kindred

(57) ABSTRACT

The present invention is directed to a system and method for storing a composite table of data. The invention involves storing a set of initial fields in an initial table, with each field having a plurality of entries; storing a definition for at least one additional field having a plurality of entries, wherein the at least one additional field is not stored; storing a common value that is common to at least two entries of the plurality of entries in the at least one additional field; and storing at least one other value that is different from the common value for the remainder of entries of the plurality of entries in the at least one additional field.

20 Claims, 3 Drawing Sheets

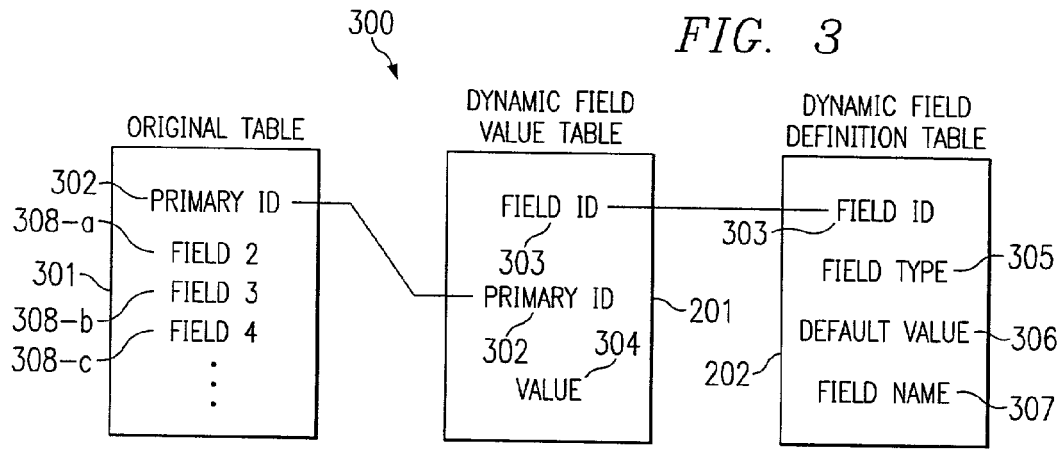

SYSTEM AND METHOD FOR STORING DATA

TECHNICAL FIELD

This invention relates in general to computer data storage and in particular to the efficient use of database fields.

BACKGROUND OF THE INVENTION

Generally, when defining tables for storage in existing databases or other types of storage mechanisms, a set of records is defined upon creation of a table, with each record including a finite number of fields. Generally, once a table having an established number of fields in the table and a finite number of fields per record is defined, data storage space sufficient to satisfy the data storage requirements of all fields of all records defined in this table are permanently allocated thereto.

A data storage efficiency issue arises with this existing table definition format. Specifically, certain fields within such table may be quite sparsely populated. Otherwise stated, data blocks for some fields may be filled or may contain data for only a small proportion of the records. Data storage space is nevertheless generally permanently allocated for such data blocks, thereby leading to a substantially inefficient use of data storage space.

An example is considered in which a data table of baseball team records associates a record with each player on a team and which assigns fields to represent characteristics of the players. For example, fields could be assigned for such characteristics as height, weight, RBIs (Runs Batted In), hitting percentage, and the like. One field of interest for the present example would be that of an indication of the number of "no-hitter" games pitched by each player. However, for the majority of players who are not pitchers, this field is inapplicable. Moreover, since data storage space was nevertheless allocated to this field, this inapplicable field would generally incur a substantial waste of storage space for those players who are not pitchers.

Therefore, it is a problem in the art that the inclusion of sparse fields in data tables causes the wastefull allocation of space to data blocks which will generally not store useful data.

It is a further problem in the art that recording data pertinent to only a small number of records in a table generally involves incorporating such field into every record in such table, thereby incurring the waste of storage space associated with sparse fields.

BRIEF SUMMARY OF THE INVENTION

The present invention is directed to a system and method for storing a composite table of data. The invention involves storing a set of initial fields in an initial table, with each field having a plurality of entries; storing a definition for at least one additional field having a plurality of entries, wherein the at least one additional field is not stored; storing a common value that is common to at least two entries of the plurality of entries in the at least one additional field; and storing at least one other value that is different from the common value for the remainder of entries of the plurality of entries in the at least one additional field.

BRIEF DESCRIPTION OF THE DRAWING

FIG. 3 is a block diagram depicting the interaction between an original table, a dynamic field value table, and a dynamic field definition table according to a preferred embodiment of the present invention;

FIG. 4 depicts an exemplary generation of dynamic values employing data from an original table, a dynamic field value table, and a dynamic field definition table according to a preferred embodiment of the present invention;

FIG. 5 depicts a composite table formed from an original table and dynamic field tables according to a preferred embodiment of the present invention;

DETAILED DESCRIPTION

Figure 1:
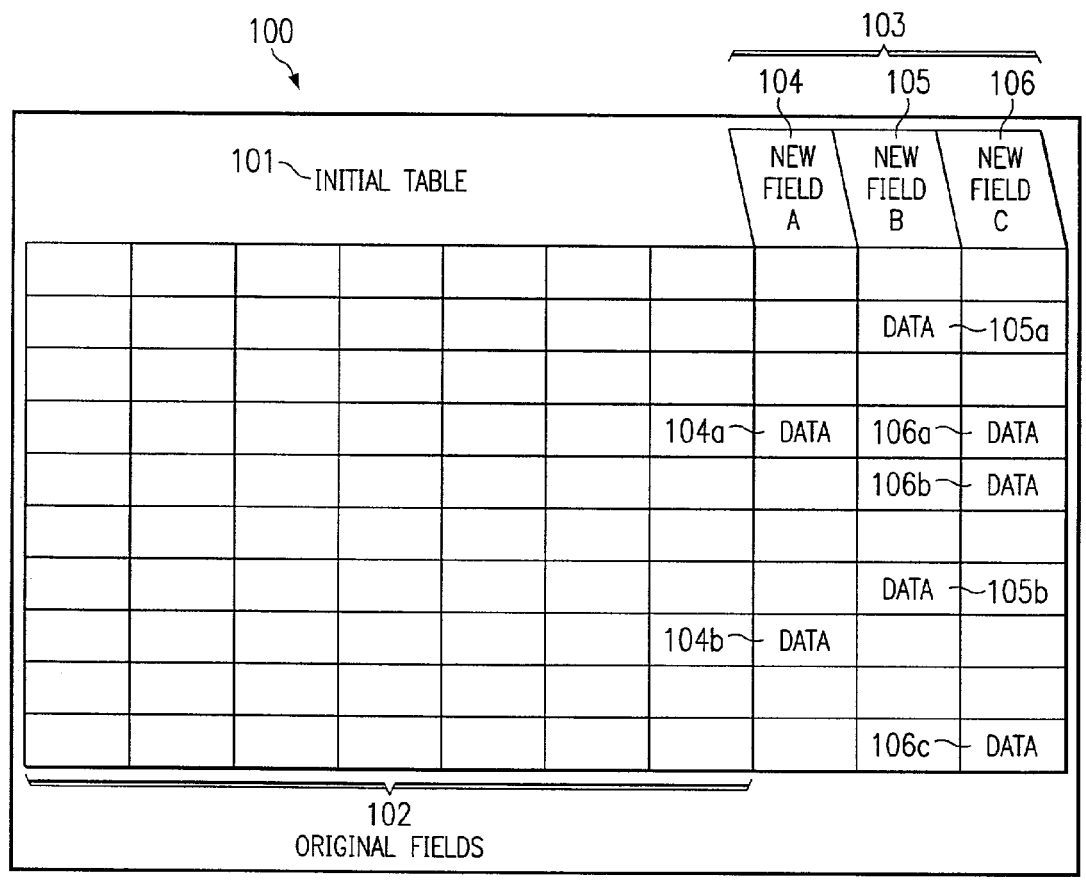
FIG. 1 depicts a data table combining additional fields to originally defined fields according to a preferred embodiment of the present invention.

The present invention is directed to a system and method which provides an ability to dynamically add fields to an original data table without changing the definition of the original table. Moreover, the invention does not require the permanent allocation of storage space for repeated occurrences or instances of the same values within sparse fields. Preferably, a composite table formed from a combination of an original table and additional dynamically added fields may be searched in much the way a single original table would be searched.

The inventive dynamic storage mechanism is preferably able to store data for sparse fields for the records that contain non-default data and thereby conserve the storage space, which in prior art approaches, would have been permanently allocated to fields which would not have pertinent data stored therein. By suitably linking the dynamically added fields with records in an original table, searches may be conducted at run-time which enable searching and querying the dynamically added fields as thoroughly and as effectively as if such fields had been included in an originally defined data table. Thus, the invention is able to provide storage space efficiency while still enabling the utility and functionality associated with the more storage space-demanding approach of including all sparse fields in an original table definition.

The invention preferably stores the original data table, along with a definition table which includes definition information for the additional field or fields, and a field value table which contains non-default values for records in the additional field or fields. A default value for the additional field is preferable included in the definition table. When a user desires to access or search the full table or composite table, the invention preferably dynamically forms the composite table. The invention preferably forms the additional field or fields from the definition table, which is then combined with the original data table. The invention then preferably populates the records of the additional field with the values in the field value table. The invention then preferably populates empty records in the additional field with the default value.

Herein, the term "record" generally corresponds to a subset of a data table which is associated with a plurality of fields. Herein, the term "data block" generally corresponds to a measure of storage space suitable for entry of data for a particular field of a particular record. Herein, the term "sparse field" generally corresponds to a field for which a small proportion of the records have defined, or non-default, data values. Conversely, the terms "extensively populated field," "densely populated field," or "dense field" generally corresponds to a field for which a large proportion of the records include defined, or non-default, data values. Herein a "defined data value" or "defined value" is generally a value to which a particular field is deliberately set and is which is generally not established by default.

FIG. 1 depicts data table 100 which has combined new fields 103 with originally defined fields 102, according to a preferred embodiment of the present invention. Preferably, when initial table 101 is defined, only original fields 102 are included in this definition. Accordingly, data storage space is allocated for original fields 102. For example, as shown in FIG. 1, initial table 101 includes seven fields (e.g. the columns) and 10 records (e.g. the rows). Thus, space for seventy data blocks for the initial table 101 will be allocated upon initially creating initial table 101.

In contrast, new fields 103, including new field A 104, new field B 105, and new field C 106, are preferably not generated as part of the creation of initial table 101. Instead, new fields 103 are preferably dynamically generated. Preferably, in the case of new fields 103, data storage space is only allocated where usable non-default data exists. Specifically, in the column associated with new field A 104, two blocks of data are shown, 104-a and 104-b. Preferably, in contrast to the situation with initial table 101, for new field A 104, only the space needed for these two data entries is reserved. Thus, a wasteful reservation of storage space for the eight records in initial table 101, for which no usable data exists in new Field A 104, is preferably beneficially avoided. Similarly, for new field 105, space is reserved only for data blocks 105-a and 105-b. Likewise, for new field 106, space is set aside for data blocks 106-a, 106-b, and 106-c.

Figure 2:
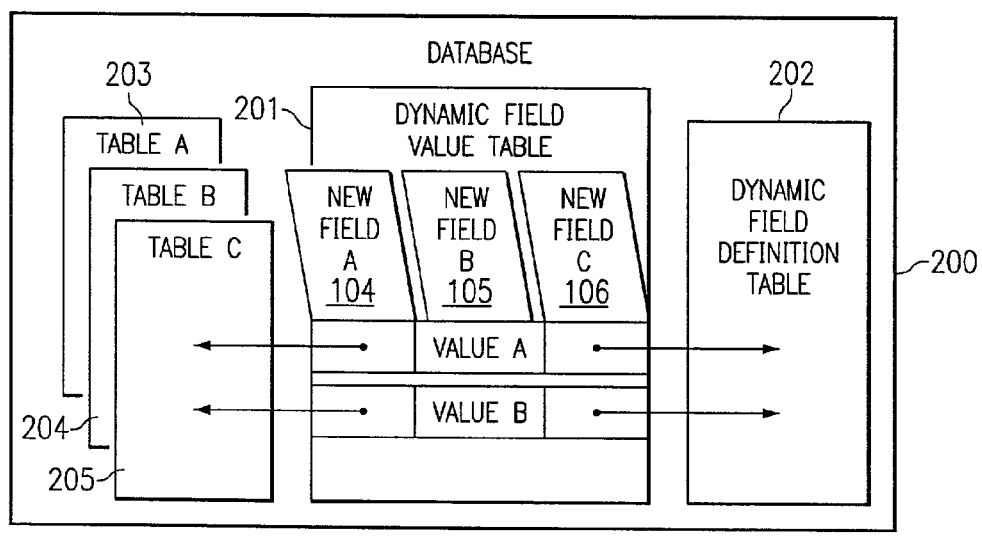
FIG. 2 depicts an overview of the interaction between original tables, dynamic field values, and dynamic field definition tables according to a preferred embodiment of the present invention.

FIG. 2 depicts an overview of the interaction between original tables 203, 204, 205, a dynamic field value table 201, and a dynamic field definition table 202 according to a preferred embodiment of the present invention. FIG. 2 provides a brief overview of how dynamic field values are stored within a preferred implementation of the inventive dynamic field allocation. Dynamic field value table 201 preferably stores the values for each of the dynamic fields. Thus, there is preferably one data block within dynamic field value table 201 to store each of the non-default dynamic field values. In a preferred embodiment, dynamic field definition table 202 and dynamic field value table 201 are both individual tables within a database, and each have their own identifier or primary key and their own records.

FIG. 3 is a block diagram depicting a database 300 and showing the interaction between original table 301, dynamic field value table 201, and dynamic field definition table 202, according to a preferred embodiment of the present invention. Original table 301 is similar to initial table 101 depicted in FIG. 1. However, it will be appreciated that original table 301 may include any number of records and/or fields.

Original table 301 preferably includes a plurality of records, a selection of which is shown by fields 2–4 308-*a* through 308-*c*. Primary ID (identification), or primary key 302, is shown within original table 301 and preferably uniquely identifies an entity described by original table 301. For example, a social security number would generally uniquely identify a taxpayer in the United States.

In a preferred embodiment, inventive database 300 includes dynamic field value table 201 and dynamic field definition table 202. Preferably, dynamic field value table 201 stores a value for a field defined outside of original table 301, but associated with a record defined within original table 301. Dynamic field definition table 202 is preferably linked to dynamic field value table 201 via field ID (identification) 303. Dynamic field definition table 202 preferably includes information that fully describes each dynamically generated field. Table 202 also preferably provides default value 306 for mapping into data blocks for the pertinent field where no user-entered or other non-default value is provided.

In a preferred embodiment, there is a one-to-many relationship between original table 301 and the values in dynamic field value table 201. This one-to-many relationship generally refers to the potential for any one record within original table 301 to be associated with an essentially unlimited number of field values within dynamic field value table 201.

In a preferred embodiment, a second one-to-many relationship between dynamic field definition table 202 and dynamic field value table 201. This one-to-many relationship generally refers to the potential for any one definition to be associated with an essentially unlimited number of field values within dynamic field value table 201.

These relationships, referred to herein as "primary keys," preferably link all three tables 301, 201, and 202 together and enable the generation of composite tables which fully list the values of all of the initially defined records and the dynamically generated records.

In a preferred embodiment, upon execution of an appropriate database generation routine, the data stored in original table 301, dynamic field value table 201, and dynamic field definition table 202 are combined to form composite tables which fully list the values of all original and sparse fields, while conserving a considerable amount of storage space associated with the storage of sparse fields. Preferably, for records in which a sparse field has a non-default value, such value 304 is initially stored in dynamic field value table or value table 201. Where the data entry for a record in a sparse field has no data, or contains a default value, such default value 306 is preferably defined in dynamic field definition table or definition table 202. While default values 306 are defined in definition table 202, such default values need not be repetitively stored nor do they need to have storage space allocated for every instance of such default value. This ability to obviate a need for repetitive storage and/or for storage space allocation for repeated instances of the same default value preferably provides the inventive database scheme with a substantial advantage in storage efficiency over the systems of the prior art.

Once a default value for a particular field is established, this default value can preferably be re-used for every record for which a default value is appropriate. Since such a default value is generally constant throughout a group of records, there is generally no need to store a plurality of instances of this default value. It is more space-efficient to store only the field values for records which have non-default values for a particular field along with an appropriate identification of the corresponding records, and to store, only once, the default value to be entered for all other records. Thus, where a default value for a field entitled "no-hitters pitched" is "0,"

the value of "0" may be stored just once. Separately, the numbers of no-hitters pitched by particular pitchers would be stored (in value table 201) and then appropriately linked to the proper record, which in this case, would generally identify a particular baseball player or pitcher. As another example, the word "right" may be stored once as the default value for the field listing the batting handedness, and "left" or "both" may be stored in value table 201 and then linked to the proper record (e.g. baseball player).

Since, for non-default values, the actual value may not be known in advance, storage space will generally have to be set aside for the non-default values. In a database including one hundred pitchers with only four of whom have hit "no-hitters," the present invention would need to store only the number of no-hitters pitched by those four pitchers. The entries for the other ninety-six pitchers would preferably be generated at run-time from a single stored default value, thereby conserving the storage space associated with ninety-six data blocks.

FIG. 4 depicts an exemplary generation of dynamic values employing data from an original table 401, a dynamic field value table 402, and a dynamic field definition table 403, according to a preferred embodiment of the present invention. Original table 401 has two columns, the first listing primary IDs 401-a, and initial fields 401-b. In the example discussed in connection with FIGS. 4 and 5, expanded original table 401 generally corresponds to a list of people. Preferably, each record corresponds to one person within this list of people, and initial fields 401-b generally corresponds to those fields included within expanded original table 401. Thus, storage space would generally be substantially permanently allocated to initial fields 401-b within expanded original table 401. Initial fields 401 could include any number of fields and a range of types of fields. Examples of field types include, but are not limited to, numbers, text, strings, yes/no, true/false, and combinations thereof. The number of fields could be any number that would be used to describe a record. For example, in baseball, many different statistics are maintained for each player, e.g. runs, hits (including singles, doubles, triples), errors, runs-batted-in, strike-outs, walks, innings played, games-played, grand-slam-home-runs, bases stolen, batting average, earned run average, strikes thrown, balls thrown, games saved, games lost, slugging percentage, etc. Note that the number of records, the number of fields, the number of entries, the field types, field names, field IDs, record IDs, values, and default values shown in the FIGURES and discussed herein are by way of example only, as others could be used, as needed to address specific implementations of the invention. All such variations are intended to be included within the scope of the present invention.

Expanded dynamic field value table 402 and expanded dynamic field definition table 403 preferably include information pertinent to adding two additional fields to a selection of the records included in expanded original table 401. In the example presented in FIG. 4, the two additional fields are named "size" and "friend" and refer respectively, to a shoe size and to the name of a friend of a person identified in each record for which these fields have entries. It will be appreciated however, that fewer or more fields could be dynamically added to initial fields 401-b included in the definition of, and allocation of storage space for, all original table 301 and, by extension, expanded original table 401. Moreover, a wide range of different field types having different data types for the additional fields may be employed depending upon the nature of the record to which such additional fields are linked, and all such variations are intended to be included within the scope of the present invention.

In a preferred embodiment, dynamic field definition table, or definition table, 403 includes four columns, including field ID 403-a, which identifies one or more fields to be added to initial fields 401-b. Definition table 403 further includes field type 403-b, which preferably identifies data type 403-b of the field identified in the field ID column 403-a. Note that field F1's data type is identified as a "number" and that field F2's data type is identified as a "string" or text string. Preferably, table 403 further includes the column field name 403-c. The field name for field F1 is "size" and that the field name for field F2 is "friend". Table 403 preferably further includes default values for each of the records identified therein, for example, in column 403-d that the default value for record F1 is the numerical value "10" and that the default value for field F2 is the null text string " ". It will be appreciated that any number of additional fields and associated default values could be defined in table 403, and all such variations are intended to be included in the scope of the present invention.

In a preferred embodiment, expanded dynamic field value table 402, or expanded value table 402, indicates the values of the added fields for a selection of the records identified in expanded original table 401. Specifically, table 402 includes field ID column 402-a for identifying the field definition of a record, which record of the original table 401 is identified in a corresponding location (e.g. in the same row) within column 402-b for which a value is provided in column 402-c. Table 402 identifies five specific (non-default or defined) values assigned into fields F1 and F2. It may be seen that numerical values for field F1 are provided for records R1, R3, and R7, and that text string values for field F2 are provided for records R1 and R5. It will be appreciated that non-default values may be provided for any number of new fields (fields in addition to initial fields 401-b), for identified records, and all such variations are intended to be included within the scope of the present invention.

FIG. 5 depicts composite table 500 formed from data taken from expanded original table 401 and tables 402 and 403, according to a preferred embodiment of the present invention. Preferably, composite table 500 presents data compiled from expanded original table 401 and tables 402 and 403 in a unified, coherent manner. By employing the specifically identified values (non-default values) for the dynamically added fields provided from expanded value table 402 and generating the default values for the new fields defined in expanded definition table 403, composite table 500 is generated at run-time.

It may be seen, in composite table 500, that for records R1–R3, data for initial fields 502 (which corresponds to column 401-b in FIG. 4) is provided. In addition, values for two exemplary additional fields, "size" (field ID F1) and "friend" (field ID F2) are also provided. For field "size" 503, it may be seen that the default value of "10" is provided for record R2 and that defined values, or non-default values, are provided for records R1 and R3. Similarly, for field "friend" 504, the default value of a null text string is provided for records R2 and R3, and the text string "Bob" (which datum is shown entered in the fourth row of expanded dynamic field value table 402) is provided for record R1.

In a preferred embodiment, once composite table 500 is generated from information in tables 401–403, it may occupy the same amount of storage space as an original data table containing the same information. This would generally be true, because once generated, the default values for various dynamically generated fields associated with selected records have been used to fully populate data blocks, in what is preferably a fully expanded data table, thus occupying an amount of storage space similar to what such values would have occupied had these values been included in expanded original table 401 as "initial fields" 401-b. However, it should be appreciated that the information used to uniquely identify the contents of composite table 500 may be stored more economically employing the invention than would be possible by storing all default and non-default values in expanded original table 401.

In a preferred embodiment, at least a portion of the storage space savings provided by the present invention arises from the condensation of default value storage in dynamic field definition table 403. Instead of allocating storage space for all instances of default values for sparse fields in a table such as expanded original table 401, the information sufficient to fully define such default values may be stored space corresponding to that needed to store only a few fields.

Generally, once a default value for a field is known, the data values for instances of this field for all records in a table may be defined by storing the non-default values of this field, the records associated with such non-default values, and one instance of each default value. Thereafter, when the invention invokes a routine, which may be a data table mapping routine, to generate composite table 500, the previously established default value is preferably entered in the pertinent field location whenever no defined value, or non-default value, exists for a particular field of a particular record. For example, since table 402 includes no specified values for the "friend" field of record R3, the previously established default value of a null text string is shown entered for the data block corresponding to record R3's "friend" field. By contrast, since a non-default value has been entered for the "size" field of record R3, the non-default value of 21 is present in this location in composite table 500.

Figure 6:
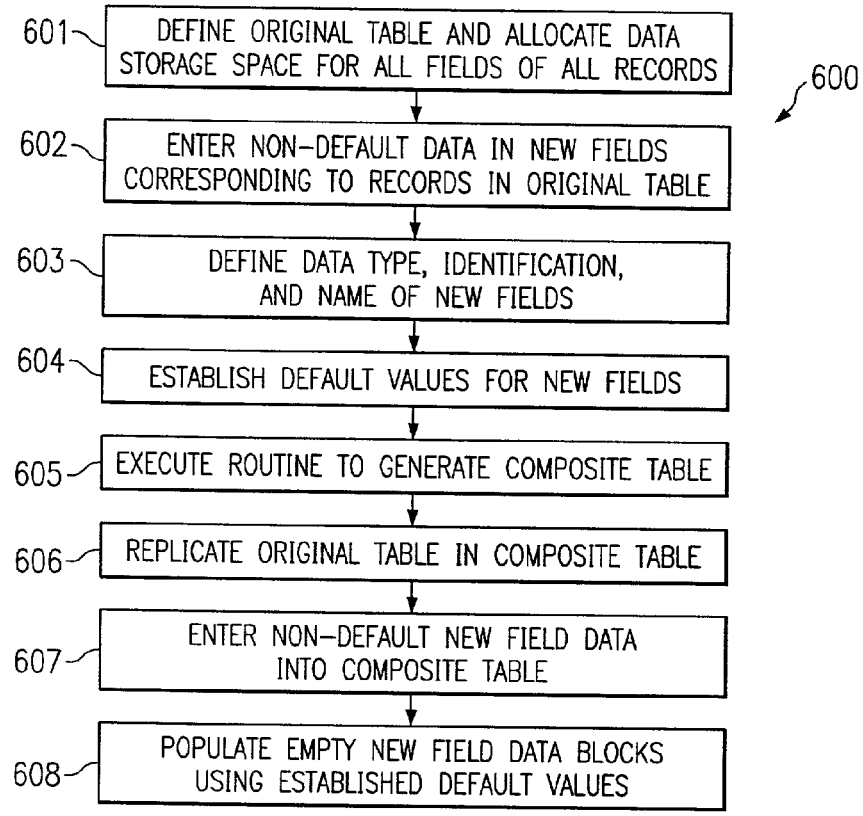
FIG. 6 depicts a sequence of steps for generating a composite table incorporating dynamically generated new field data according to a preferred embodiment of the present invention.

FIG. 6 depicts a sequence of blocks 600 for generating a composite table, such as composite table 500, incorporating dynamically generated new field data according to a preferred embodiment of the present invention. Preferably, at block 601, original table 401 is defined and data storage space allocated for storing initial fields 401-b of each record in original table 401. At block 602, defined field values, which are generally non-default values, are preferably entered in new fields of records in expanded original table 401 and stored, thereby generating expanded dynamic field value table 402. At block 603, the data type, field identification, and name of new fields to be linked with records in expanded original table 401 are preferably defined and stored, thereby providing dynamic field definition table 403. At block 604, default values 403-d for each of the new fields are preferably established in dynamic field definition table 403. It will be appreciated that the default value for a particular new field need only occupy the storage space of a single data block when defined, as described herein, within table 403, even where this default value is eventually repeatedly entered in composite table 500 (FIG. 5). This approach beneficially operates to consume less storage space than the prior art approach of separately allocating data blocks for each instance of a default value for a particular field.

In a preferred embodiment, at block 605, a computer software routine is preferably invoked to generate composite table 500. A general purpose computer system, such as computer system 700 (FIG. 7), may be employed for this purpose. Moreover, a combination of an algorithm, embodied in a computer program and running on a general purpose computer system, such as computer system 700, may be employed to perform one or more of blocks 601 through 608. For a selection of steps 601 through 608, a combination computer software and hardware and human user interaction with such computer software and hardware may be employed, and all such variations are intended to be included within the scope of the present invention. Herein the term "data table mapping routine" generally corresponds to a computer program for generating composite table 500. This program preferably maps individual instances of default values, entered in dynamic field definition table 403, for various fields, onto what may be a plurality of locations, or data blocks, within composite table 500.

In a preferred embodiment, at step 606, expanded original table 401 is preferably replicated and made part of composite table 500. At step 607, non-default new field data, which may be user-selected, is preferably entered into composite table 500.

Preferably, upon completion of step 607, all new field values which are known, and which have non-default values, have been entered in the appropriate data blocks. Preferably, the only new field data blocks which would remain empty after completion of step 607 are those for which entry of a default value is appropriate. Accordingly, in step 608, unfilled new field data blocks are preferably populated with the default values established in step 604. It will be appreciated that default values for a sparse field which has, for example, only two non-default values, out of one hundred records linked to this field, may be generated from a single stored instance of this default value. Thus, although the space necessary to store ninety-eight instances of a default value may need to be allocated upon generation of composite table 500, the ongoing storage of information capable of unambiguously defining the contents of, and of generating, composite table 500 may be beneficially limited to that needed to store only a single instance of this default value. Accordingly, significant data storage efficiency may be gained by employing the inventive database management system.

Herein, where no value is deliberately entered by a user or other means for providing a new field value, a default value is generally entered for such new field. However, it will be appreciated that a consciously, or deliberately, entered value (i.e. one not arrived at by default) may coincide with a default value for a particular field and remain within the bounds of the present invention. For example, with reference to the field F1 in FIG. 4, the default value for the "size" field is 10. In the example of FIG. 4, a value for "size" of "10" could be deliberately entered into table 403 for a particular record and technically not be a "default value" even though the entered data is coincidentally equal to the value selected as the default value for this field.

Note that the invention has been described in terms of forming a composite table by combining an initial table with a dynamically created portion. However, the invention can operate to form a composite table entirely (or mostly) from dynamical created fields. The definitions, default values, and defined values for the entire table can be stored in the dynamic field value table and the dynamic field definition table (with either no original table or a relatively small original table), which are then used to form the composite table.

When implemented in software, aspects of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 7:
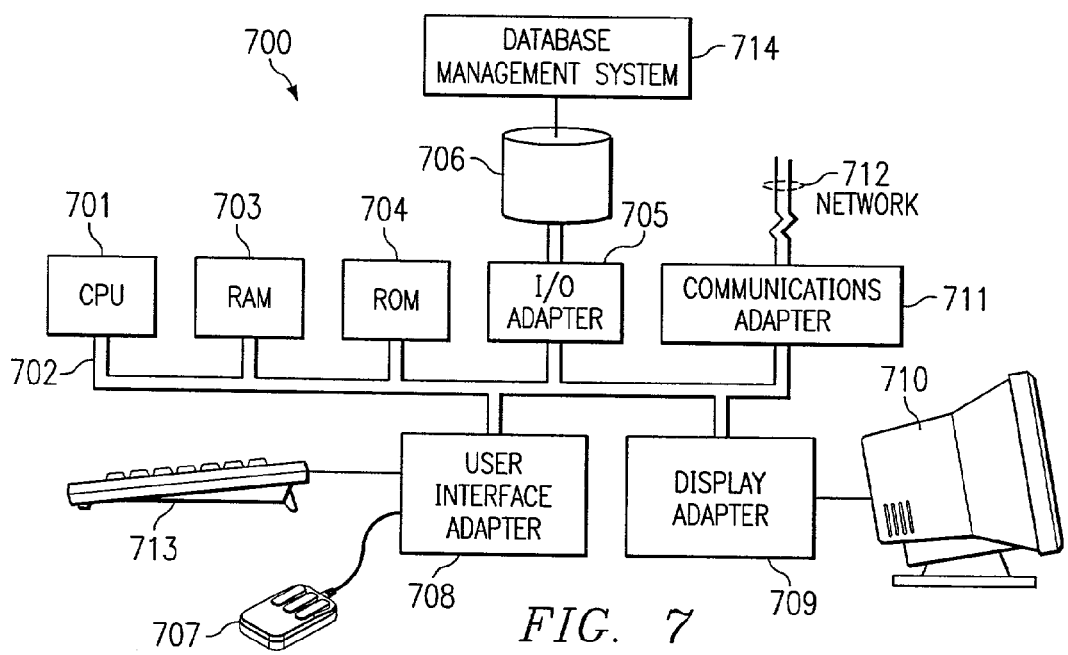
FIG. 7 depicts computer apparatus adaptable for use with a preferred embodiment of the present invention.

FIG. 7 illustrates computer system 700 adaptable for use with a preferred embodiment of the present invention. Central processing unit (CPU) 701 is coupled to system bus 702. CPU 701 may be any general purpose CPU, such as a Hewlett Packard PA-8700. However, the present invention is not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to Bus 702, which may be PROM, EPROM, or EEPROM. RAM 703 and ROM 704 hold user and system data and programs as are well known in the art.

Bus 702 is also preferably coupled to input/output (I/O) adapter 705, communications adapter card 711, user interface adapter 708, and display adapter 709. I/O adapter 705 connects to storage devices 706, such as one or more of a hard drive, CD drive, floppy disk drive, tape drive, to the computer system. Communications adapter 711 is adapted to couple computer system 700 to Network 712, which may be one or more of a local area network (LAN), wide-area network (WAN), Ethernet or Internet network. User interface adapter 708 couples user input devices, such as keyboard 713 and pointing device 707, to computer system 700. Display adapter 709 is driven by CPU 701 to control the display on display device 710. Database management system 714 is preferably a computer program which is preferably stored in storage devices 706.

What is claimed is:

1. A computer implemented method for storing a composite table of data, the method comprising:
    storing a set of initial fields in an initial table, with each field having a plurality of entries;
    storing a definition for at least one additional field having a plurality of entries, wherein the at least one additional field is not stored;
    storing a common value that is common to at least two entries of the plurality of entries in the at least one additional field; and
    storing at least one other value that is different from the common value for the remainder of entries of the plurality of entries in the at least one additional field.

2. The method of claim 1 wherein said common value is a default value for the at least one additional field.

3. The method of claim 1 wherein:
    when the composite table is to be accessed, the composite table is dynamically generated from the initial table, the definition for the at least one additional field, the common value, and the at least one other value.

4. The method of claim 3 wherein:
    the generated composite table is stored, at least temporarily, to permit accessing of the generated composite table.

5. The method of claim 1 wherein:
    the other value is associated with an identifier of the initial table and an identifier of the definition.

6. The method of claim 1 wherein:
    the definition comprises an identifier, an indication of field type, and indication of field name.

7. The method of claim 6 wherein:
    the definition further comprises the common value.

8. A computer implemented method for forming a composite table of data from compactly stored data, the method comprising:
    retrieving a stored initial table that comprises a plurality of initial fields and a plurality of records, with each combination of a record and an initial field has an entry of the initial table;
    retrieving a stored definition for at least one additional field that is associated with the plurality of records, wherein the definition includes a stored common value that is associated with at least two records for the at least one additional field;
    retrieving at least one other stored value that is different from the common value for the remainder of records of the at least one additional field; and
    generating the composite table from the initial table, the definition for the at least one additional field, and the at least one other value.

9. The method of claim 8 wherein:
    the at least one additional field is not stored.

10. The method of claim 8 further comprising:
    receiving a request to access the composite table.

11. The method of claim 8 wherein:
    the common value is a default value for the at least one additional field.

12. The method of claim 8 further comprising:
    storing, at least temporarily, the generated composite table to permit accessing of the composite table.

13. The method of claim 8 wherein:
    the other value is associated with an record identifier of the initial table and an identifier of the definition.

14. The method of claim 9 wherein:
    the definition further comprises an identifier, an indication of field type, and indication of field name.

15. The method of claim 8 wherein generating the composite table comprises:
    replicating the initial table in the composite table;
    establishing the at least one additional field from the definition in the composite table;
    populating the at least one additional field with the at least one other value; and
    populating the at least one additional field with the common value.

16. The method of claim 15 wherein populating the at least one additional field with the common value comprises:
    after operation of populating the at least one additional field with the at least one other value, locating empty records in at least one additional field; and
    populating each empty record with the common value.

17. A system for storing data comprising:
    a memory;
    an initial table that is stored in the memory and comprises a plurality of initial fields, wherein each initial field has a plurality of entries;
    a dynamic field definition table that is stored in the memory and comprises a definition for at least one additional field and a default value that is associated with the at least one additional field, wherein the at least one additional field is not stored on the memory; and a dynamic field values table that is stored in the memory and comprises values that are different from the default value and are associated with the at least one additional field.

18. The system of claim 17 further comprising:
a data table mapping routine that generates a composite table from said initial table, said dynamic field values table, and said dynamic field definition table.

19. The system of claim 17 wherein the dynamic field values table further comprises:
an identifier of the initial table; and
an identifier of the dynamic field definition table.

20. The system of claim 17 wherein the dynamic field definition table further comprises:
an identifier;
a field type; and
a field name.

* * * * *